United States Patent [19]

Miyake et al.

[11] Patent Number: 5,271,010
[45] Date of Patent: Dec. 14, 1993

[54] VIRTUAL IDENTIFIER CONVERSION SYSTEM

[75] Inventors: Hiroshi Miyake; Satoshi Kakuma; Shuji Yoshimura; Naoki Aihara, all of Kawasaki; Naoki Fukuda, Fukuoka, all of Japan

[73] Assignee: Fujitsu Limited, Kawasaki, Japan

[21] Appl. No.: 780,108

[22] Filed: Oct. 21, 1991

[30] Foreign Application Priority Data

Oct. 20, 1990 [JP] Japan ............................ 2-282605

[51] Int. Cl.⁵ .................................... H04J 3/24
[52] U.S. Cl. ......................... 370/94.1; 370/60; 370/79
[58] Field of Search ................ 370/94.1, 79, 60

[56] References Cited

U.S. PATENT DOCUMENTS

| | | | |
|---|---|---|---|
| 4,890,280 | 12/1989 | Hirata | 370/60 |
| 4,937,814 | 6/1990 | Weldink | 370/60 |
| 5,084,867 | 1/1992 | Tachibana | 370/60 |

Primary Examiner—Douglas W. Olms
Assistant Examiner—Russell W. Blum
Attorney, Agent, or Firm—Staas & Halsey

[57] ABSTRACT

A virtual channel converter converts a virtual path identifier and a virtual channel identifier, e.g. in a twenty-eight (28) bit frame, attached to the header part of an incoming ATM cell on an input highway to an ATM switcher to identifiers to be attached to an outgoing ATM cell on an output highway capable of fully supporting all the combinations, two hundred fifty-six (256) for example, of a virtual path identifier and a virtual channel identifier no matter where the virtual path identifier and the virtual channel identifier are located in the twenty-eight (28) bit frame. The virtual channel converter comprises a plurality of identifier comparator units and a controller. Each of the identifier comparator units has an input identifier memory for storing an identifier attached to an ATM cell and a comparator for comparing the identifiers of an incoming ATM cell with the identifiers stored in the input identifier memory. The controller instructs respective input identifier memories to store all the values of identifiers attached to incoming ATM cells from a user to a switcher on a one-to-one basis.

5 Claims, 16 Drawing Sheets

VIRTUAL IDENTIFIER CONVERSION SYSTEM

BACKGROUND OF THE INVENTION

1. Field of the Invention

This invention pertains to a communications system utilizing ATM (Asynchronous Transmission Mode) cells, and more particularly to a virtual identifier (VPI/VCI) conversion system in a virtual channel converter (VCC) provided before an ATM cell switcher. The virtual identifier (VPI/VCI) conversion system converts a virtual path identifier (VPI) and a virtual channel identifier (VCI) attached to an incoming ATM cell on an input highway of the ATM cell switcher to those to be attached to an outgoing ATM cell on an output highway thereof and attaches a tag comprising information of the ATM cell switching within the ATM cell switcher, before inputting the ATM cell to the switcher.

2. Description of the Related Art

A Broadband Integrated Services Digital Network (B-ISDN) transmits cells in a packet form having a fixed length. Such cells are called ATM cells. The header parts of these cells have a virtual path identifier (VPI) and a virtual channel identifier (VCI), which identify the cell destination and so forth.

FIG. 1 is a block diagram of an ATM cell switching system

A virtual channel converter (VCC) 1 receives an incoming ATM cell transmitted to the ATM cell switching system from one of its input highways, converts the virtual identifiers (VPI/VCI) in the ATM cell, and attaches a tag to the ATM cell for its switching within the switcher. More specifically, the VCC 1 converts the VPI and VCI in the header part of an incoming ATM cell on an input highway to those of an outgoing ATM cell on an output highway, and also adds the tag for its switching control.

A multiplexer (MUX) 2 multiplexes an ATM cell outputted from the VCC 1. Switching modules 3, 4 and 5 in the first, second and third stages of a switcher switch the multiplexed ATM cell. A demultiplexer (DMX) 6 demultiplexes and outputs the multiplexed ATM cell to one of plural output highways. Here, the switching modules 3, 4 and 5 are generally called self-routing modules (SRMs). The SRM in a particular stage switches an ATM cell according to the content of the tag attached by the VCC 1. Thus, the switching modules 3, 4 and 5 together switch the ATM cell finally to the destined one of the plural output highways.

FIG. 2 shows an ATM cell format.

An ATM cell comprises five (5) bytes of a header part for storing its VPI and VCI and forty-eight (48) bytes of an information field for storing data to be transmitted.

The content in the five (5) bytes of the header part for a UNI cell transmitted between a user and a network is slightly different from that for an NNI cell transmitted between networks. Although a UNI cell includes four (4) bits for indicating a general flow control (GFC) used by a user terminal as shown in FIG. 2, an NNI cell does not include four (4) GFC bits.

After the four (4) GFC bits (or in their absence), the header part contains the VPI and VCI of the ATM cell, four (4) bits for specifying a payload type (PT), and eight (8) bits for a header error control (HEC) used in correcting a header error. Therefore, a UNI cell has twenty-four (24) bits of a VPI/VCI, whereas an NNI cell has twenty-eight (28) bits of VPI/VCI.

FIG. 3 is a block diagram of a conventional virtual channel converter (VCC).

A call processor (CPR) 7 controls the switching of all the ATM cells. An order taker/server 8 controls the communications path according to a command from the CPR 7. An input VPI/VCI register 9 and a header inserter 10 receive an incoming ATM cell from an input highway (IHW).

Then, an input VPI/VCI register 9 supplies the input VPI/VCI in a maximum of twenty-eight (28) bits to a conversion table random access memory (RAM) 13, as its read address, at timings generated by a timing generator (TG) 11.

The conversion table RAM 13 stores, according to an advance command from the CPR 7 through the order taker/server 8, the VPI/VCI of an outgoing ATM cell in correspondence with the VPI/VCI of an incoming ATM cell and a tag giving information necessary for routing the ATM cell in the switching modules 3, 4 and 5, (which are SRMs,) and the demultiplexer 6. The conversion table RAM 13 outputs the storage content corresponding to the input VPI/VCI to the header inserter 10.

Here, it is assumed that the SRM in a particular stage, i.e. one of the switching modules 3, 4 and 5, and the demultiplexer 6 require four (4) bits each, i.e. sixteen (16) bits in total, for routing an ATM cell. These sixteen (16) bits compose the tag, which is added before the VPI/VCI in a maximum of twenty-eight (28) bits. Thus, the conversion table RAM 13 outputs forty-four (44) bits. The header inserter 10 attaches the content to the ATM cell before the switcher receives it.

As explained by referring to FIG. 3, because the conversion table RAM 13 stores the conversion information for VPI/VCI and tag information for routing an ATM cell within the switcher, the conversion table RAM 13 must have $2^{28}$, i.e. about two hundred sixty million (260,000,000), addresses. The current art can not easily convert an input VPI/VCI having twenty-eight (28) bits to forty-four (44) bits including also tag information, because of problems in hardware amount and access speed.

Thus, instead of supporting all twenty-eight (28) bits composing the VPI/VCI, the conventional art compresses the twenty-eight (28) bits to eight (8) bits, thereby constructing a conversion table RAM 13 comprising $2^8$, i.e. two hundred fifty-six (256), addresses. Although this is technically possible, its general use is impossible, because compatibility with the conversion table RAMs of other models must be sacrificed.

That is, when only eight (8) of the twenty-eight (28) bits are supported, the problem arises which eight (8) bits out of the twenty-eight (28) bits are to be used. For instance, a model using the eight (8) least significant bits (LSB) is not compatible with another using the eight (8) most significant bits (MSB).

SUMMARY OF THE INVENTION

This invention aims at realizing a generally compatible VPI/VCI conversion by supporting all twenty-eight (28) bits in a VPI/VCI combination, even when the VPI and VCI reside at separate parts of the twenty-eight (28) bits of a header part.

A feature of the present invention resides in a virtual identifier conversion system, put in a stage preceding a switcher for use in a broadband integrated services digital network, for converting a virtual path identifier and a virtual channel identifier attached to an ATM cell on an input highway of the switcher to a virtual path identifier and a virtual channel identifier to be attached to the ATM cell on an output highway and for attaching a tag for routing the ATM cell in the switcher, the virtual identifier conversion system comprising: a plurality of identifier comparator units, each comprising an input identifier storing means for storing the virtual path identifier and the virtual channel identifier attached to the header part of the ATM cell on the input highway, and a comparing means for comparing for a match the virtual path identifier and the virtual channel identifier attached to the ATM cell inputted from the input highway with the content stored in the input identifier storing means; and a controlling means for storing all the combinations of a virtual path identifier and a virtual channel identifier attachable to an ATM cell inputted to the switcher, on a one-to-one basis, in an appropriate one of the input identifier storing means respectively in the plurality of identifier comparator units.

DESCRIPTION OF THE PREFERRED EMBODIMENTS

Underlying Principles

Before actual embodiments of this invention are explained in detail, their underlying principles are explained.

Figure 4:
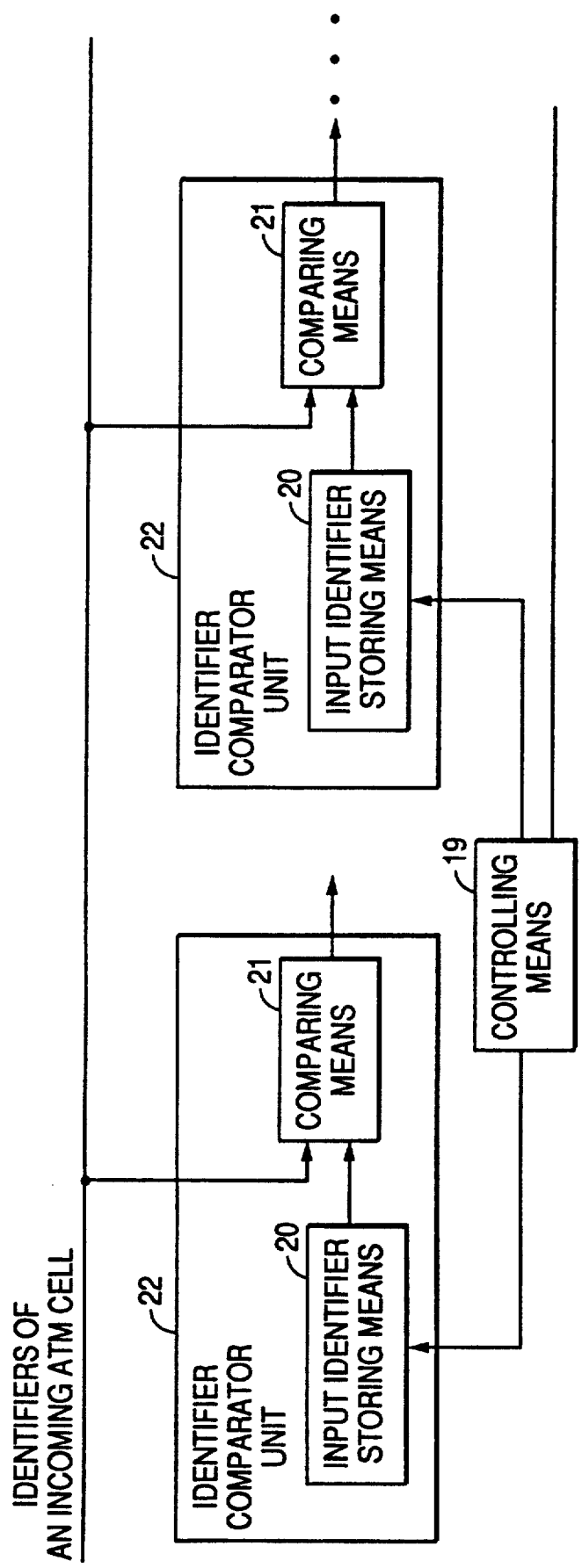
FIG. 4 is a block diagram of a first form of this invention.
Figure 5:
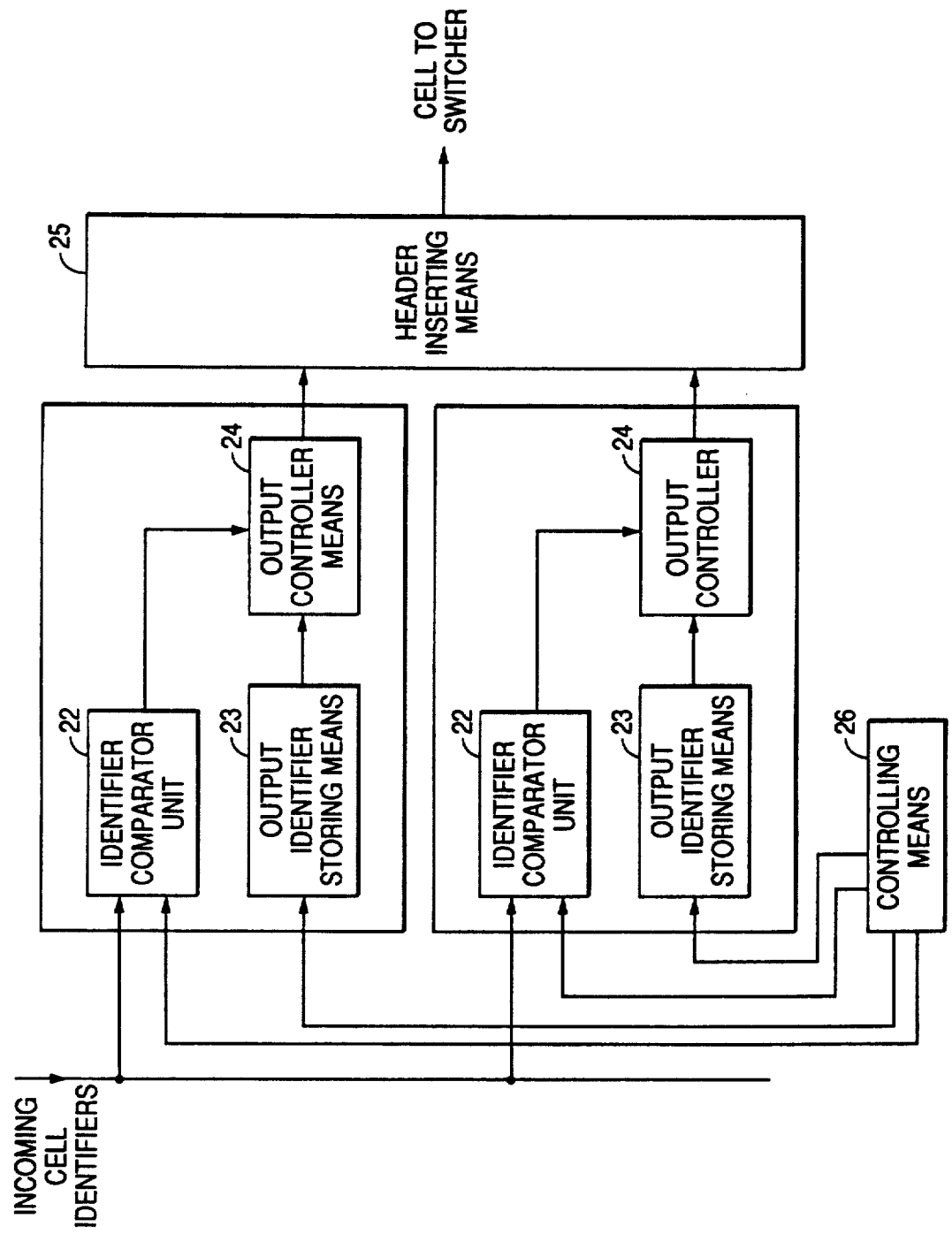
FIG. 5 is block diagram of a second form of this invention.
Figure 6:
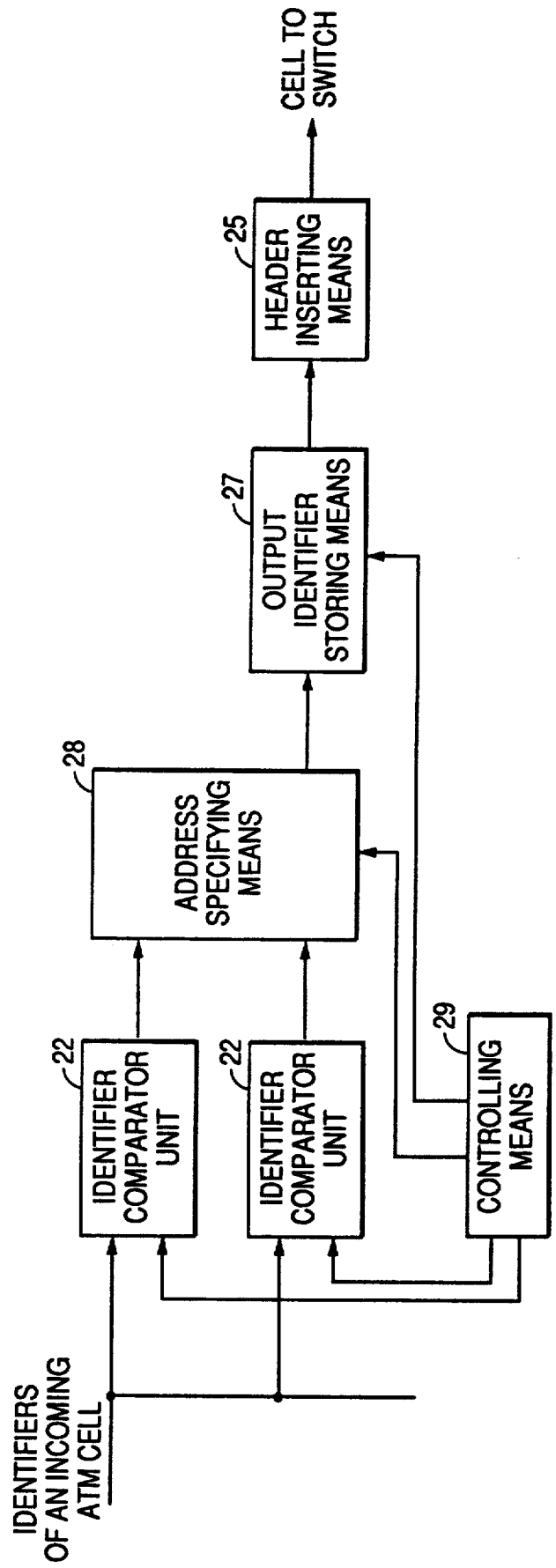
FIG. 6 is a block diagram of a third form of this invention.

FIGS. 4, 5 and 6 are for explaining the underlying principles of the virtual identifier conversion system according to this invention. The virtual identifier (VPI/VCI) conversion system is provided in a virtual channel converter (VCC) before an ATM cell switcher. The virtual identifier (VPI/VCI) conversion system converts a virtual path identifier (VPI) and a virtual channel identifier (VCI) attached to an incoming ATM cell on an input highway of the ATM cell switcher to those to be attached to an outgoing ATM cell on an output highway thereof and attaches a tag comprising information of the ATM cell switching in a self-routing module within the ATM cell switcher, before inputting the ATM cell to the switcher.

FIG. 4 is a block diagram of a first form of this invention.

The first form of this invention has a plurality of identifier comparator units 22 respectively comprise one of comparing means 21 and a corresponding one of input identifier storing means 20. The identifier comparator units 22 comprising the input identifier storing means 20 and the comparing means 21 are assumed to be provided in correspondence with the total number of combinations of identifiers (VPIs and VCIs) attached to incoming ATM cells, e.g. inputted from subscribers to the switcher via its input highways. A controlling means 19 controls the storage of these identifiers in the input identifier storing means 20.

As described earlier, the combination of a VPI and a VCI forms a total of up to twenty-eight (28) bits. Thus, in theory there are a maximum of $2^{28}$ or about two hundred sixty million (260,000,000) combinations. However, in reality, the total number of such combinations is far less and is considered to be in the order of $2^8$, i.e. two hundred fifty-six (256). Accordingly, this invention assumes there are two hundred fifty-six (256) combinations of identifiers and that the identifier comparator units 22 comprising the input identifier storing means 20 and the comparing means 21 are provided respectively in a total of two hundred fifty-six (256).

The corresponding input identifier storing means 20 in one (1) of the identifier comparator units 22 stores the VPI and VCI attached to the header part of an incoming ATM cell on an input highway received from an order taker/server in response to an instruction by a call processor, which are in a controlling means 19. The corresponding one of the comparing means 21 in the same one of the identifier comparator units 22 compares the VPI and VCI attached to the header part of the incoming ATM cell actually inputted from an input highway with the content of the input identifier storing means 20 for a match.

That is, the input identifier storing means 20 in the corresponding identifier comparator units 22 store different combinations of input identifiers (VPIs/VCIs). When any of these combinations matches the identifiers attached to the header part of an incoming ATM cell actually received from an input highway, only the particular one of the comparing means 21 outputs a comparison result indicating a match.

There are two hundred fifty-six (256) identifier comparator units 22, for example, in correspondence with the number of all combinations of the VPI and VCI attached to the header part in the incoming ATM cells. The input identifier storing means 20 in the identifier comparator units 22 store the contents of the identifiers in the header part of all incoming ATM cells from input highways. Each of the identifier comparator units 22 has a different memory content. The comparing means 21 in all the identifier comparator units 22 receive the content of the VPI and VCI taken from an incoming ATM cell actually received. As a result, one of the two hundred fifty-six (256) identifier comparator units 22 outputs a match signal showing that the comparison result is a match.

FIG. 5 is block diagram of a second form of this invention.

The second form of this invention adds the following to the elements used in the first form of this invention. Output identifier storing means 23 and output controllers 24 are provided respectively for the identifier comparator units 22. Also a header inserting means 25 is provided. The output identifier storing means 23 stores the memory contents of the input identifier storing means 20, i.e. the VPIs and VCIs to be attached to the header part of outgoing ATM cells on output highways and tags giving information about switching ATM cells in the switcher received from an order taker/server in a controlling means 26.

That is, the input identifier storing means 20 respectively in the identifier comparator units 22 store different combinations of input identifiers (VPIs/VCIs).

When any of the comparing means 21 in the identifier comparator units 22 detect a match between the contents of one of the input identifier storing means 20 and the identifiers attached to the header part of an incoming ATM cell actually received from an input highway, the output controlling means 24 has the particular one of the comparing means 21 output the content of the corresponding one of the output identifier storing means 23. The header inserting means 25 inserts this content into the header part of the incoming ATM cell actually received from an input highway, and supplies it to the switcher.

The corresponding one of the output controllers 24 forwards the match signal outputted from one of the comparing means 21 in the corresponding one of the two hundred fifty-six (256) identifier comparator units 22 causes the corresponding one of the output controllers 24 to output the memory content in the corresponding one of the output identification storing means 23 to the header inserting means 25. The header inserting means 25 inserts the memory content in the header part of the incoming ATM cell on its way to the switcher. Here, the output identifier storing means 23 are provided for the respective ones of the two hundred fifty-six (256) identifier comparator units 22, and the memory contents in the input identifier storing means 20 correspond one-to-one to those in the output identifier storing means 23.

FIG. 6 is a block diagram of a third form of this invention.

The third form of this invention utilizes an output identification storing means 27, an address specifying means 28 and a header inserting means 25. According to the instruction by the controlling means 29, the output identifier storing means 27, e.g. comprising a random access memory, stores VPIs and VCIs, e.g. corresponding to two-hundred fifty-six (256) addresses, to be attached to the header part of outgoing ATM cells on output highways and also stores the tags giving information for routing ATM cells in the switcher.

The address specifying means 28 specifies an address in the output identifier storing means 27 in response to a receipt of an output from one of the comparing means 21 in the corresponding one of the identifier comparator units 22, which are provided in correspondence with the total number of combinations of VPIs and VCIs, e.g. two hundred fifty-six (256) combinations. The address is specified e.g. by converting 1 through 256, respectively for the two hundred fifty-six (256) identifier comparator units 22, from decimal numbers to binary numbers to be used as read addresses for accessing the output identifier storing means 27.

The output identifier storing means 27 outputs the memory content specified by a read address to the header inserting means 25, which inserts this content into the header part of the incoming ATM cell on its way to the switcher.

The address specifying means 28 receives all the outputs from the two hundred fifty-six (256) comparators 22. When one of the comparing means 21 in the corresponding one of the two hundred fifty-six (256) comparators 22 outputs a match signal, the address specifying means 28 specifies the read address for accessing the output identification storing means 27. The header inserter inserts the VPI and VCI to be attached to an outgoing ATM cell on an output highway as well as the tag giving information for routing the incoming ATM cell in the switcher, which are read from the output identifier storing means 27 by the read address, in the header part of the incoming ATM cell on its way to the switcher.

As described earlier, this invention enables all twenty-eight (28) bits of the VPI and VCI attached to the header part of an incoming ATM cell to be fully supported.

This invention physically provides e.g. two hundred fifty-six (256) identifier comparators for comparing the VPI and VCI of an incoming ATM cell with their memory contents. Because respective comparators individually compare the VPI and VCI in a maximum of twenty-eight (28) bits with their memory contents, this invention enables the VPI and VCI of an incoming ATM cell to be converted to those of an outgoing ATM cell, no matter where in the twenty-eight (28) bits the two hundred fifty-six (256) identifier combinations reside, as described later.

Actual Embodiments

Figure 7:
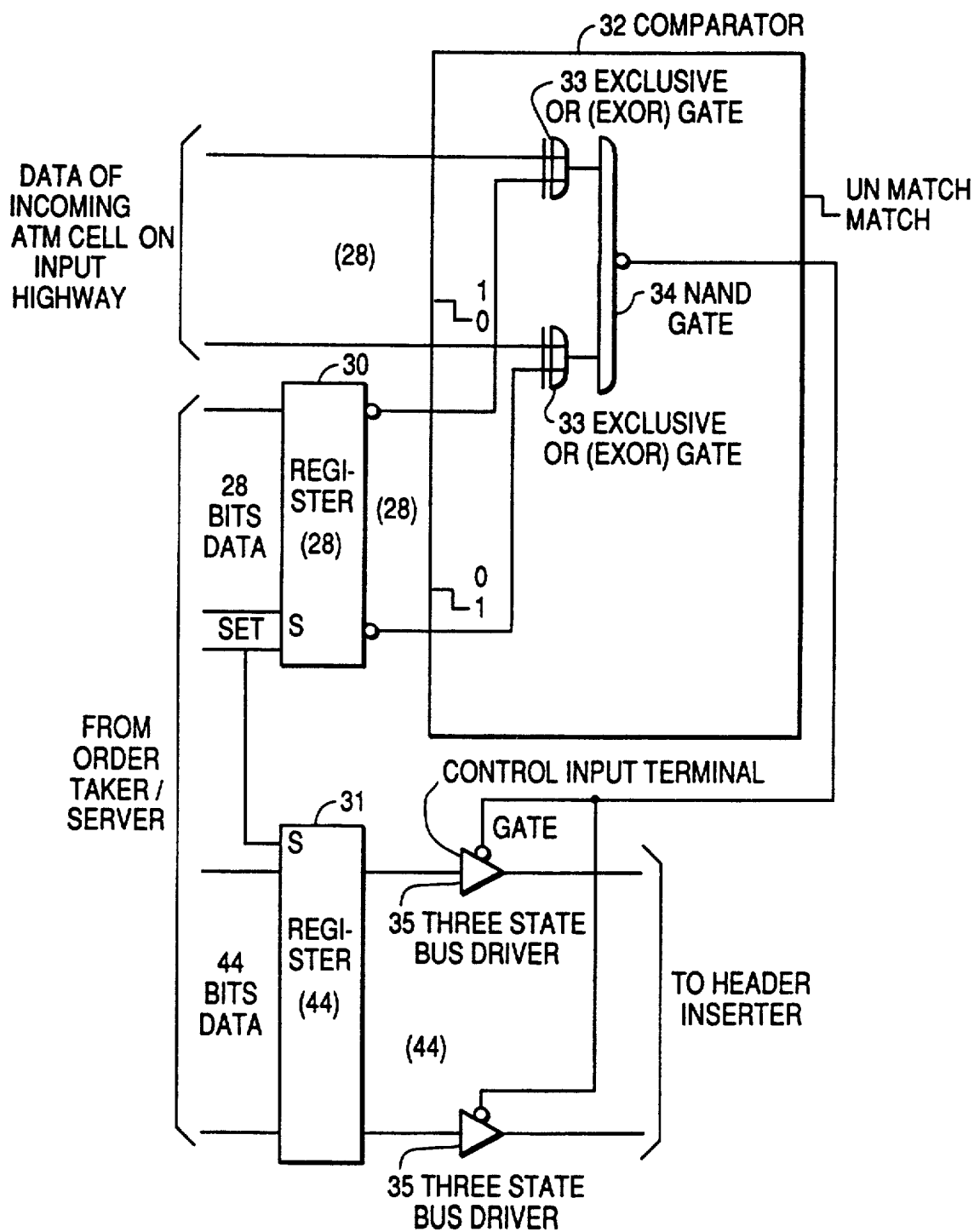
FIG. 7 is a block diagram of an embodiment of a virtual identifier conversion system.

FIG. 7 is a block diagram of an embodiment of a virtual identifier conversion system.

A first register 30 corresponds to the input identifier storing means 20 shown in FIG. 4 and stores all possible VPIs and VCIs attached to incoming ATM cells on input highways. A second register 31 corresponds to the output identifier storing means 23 shown in FIG. 5 and stores a total of forty-four (44) bits comprising all combinations of a VPI and a VCI in a maximum of twenty-eight (28) bits to be attached to the header part of outgoing ATM cells in a one-to-one correspondence with the memory content in the first register 30, as well as tags in sixteen (16) bits.

A comparator 32 comprises twenty-eight (28) EXOR gates 33 and a NAND gate 34 for receiving their outputs. The twenty-eight (28) EXOR gates 33 receive the stored contents in the first register 30 in negative logic and the VPI/VCI data attached to the header part of incoming ATM cells on input highways in positive logic, both in one (1) bit units. When the contents of the first register 30 match those of the identifiers attached to an incoming ATM cell, the NAND circuit 34 output an "L" level signal, which is supplied to a control input terminal of three state bus drivers 35 to put it in an "ON" state. This causes the three state bus drivers 35 to output identifiers and a tag in a total of forty-four (44) bits stored in the second register 31 to a header inserter, described later.

As illustrated in FIG. 5, there are two hundred fifty-six (256) sets of circuit modules, the same as that shown in FIG. 6. Only one of those sets outputs the contents of the second register 31 to the header inserter.

Figure 8:
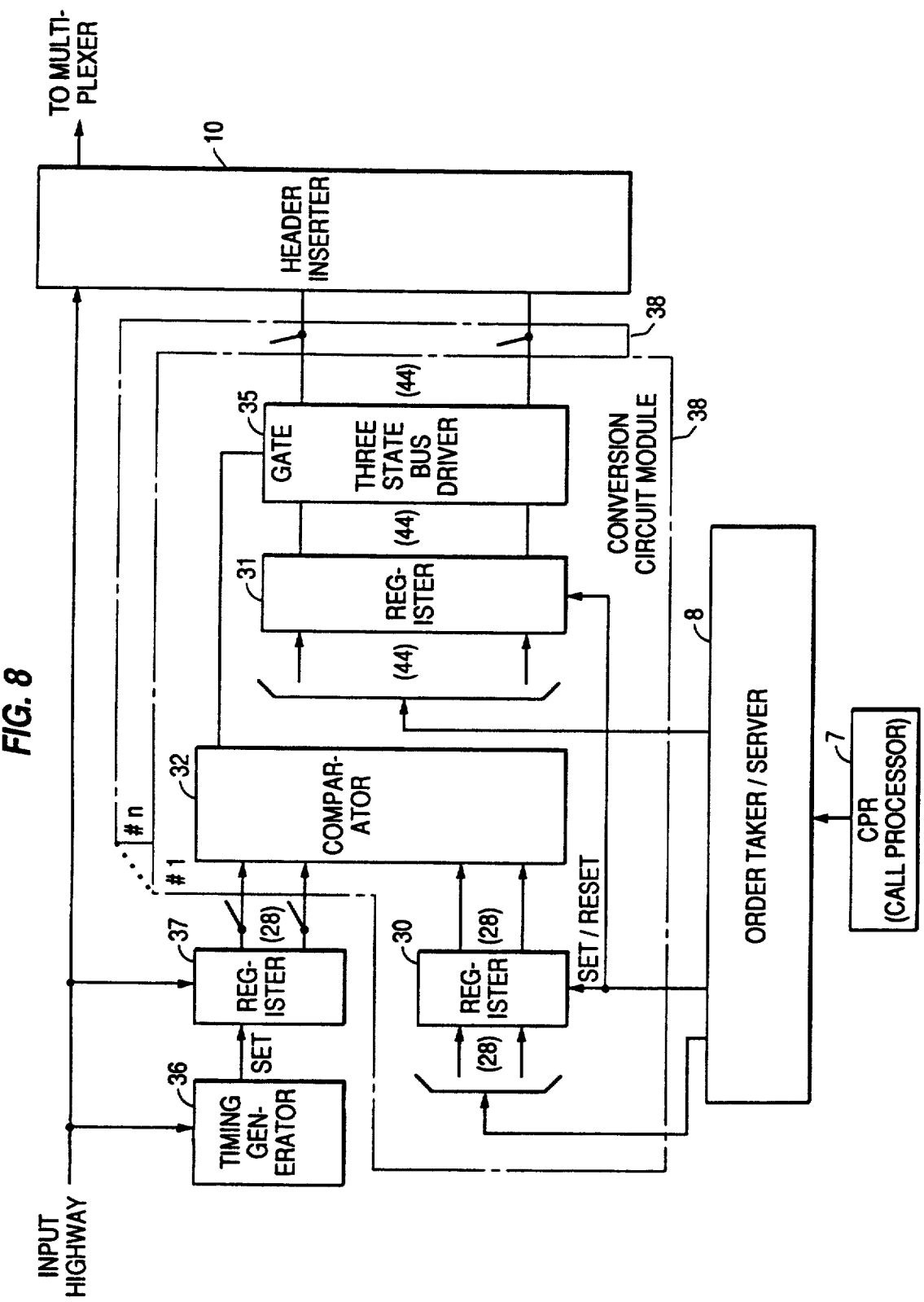
FIG. 8 is a block diagram of a first embodiment of a virtual channel converter (VCC)

FIG. 8 is a block diagram of a first embodiment of a virtual channel converter (VCC).

Figure 3:
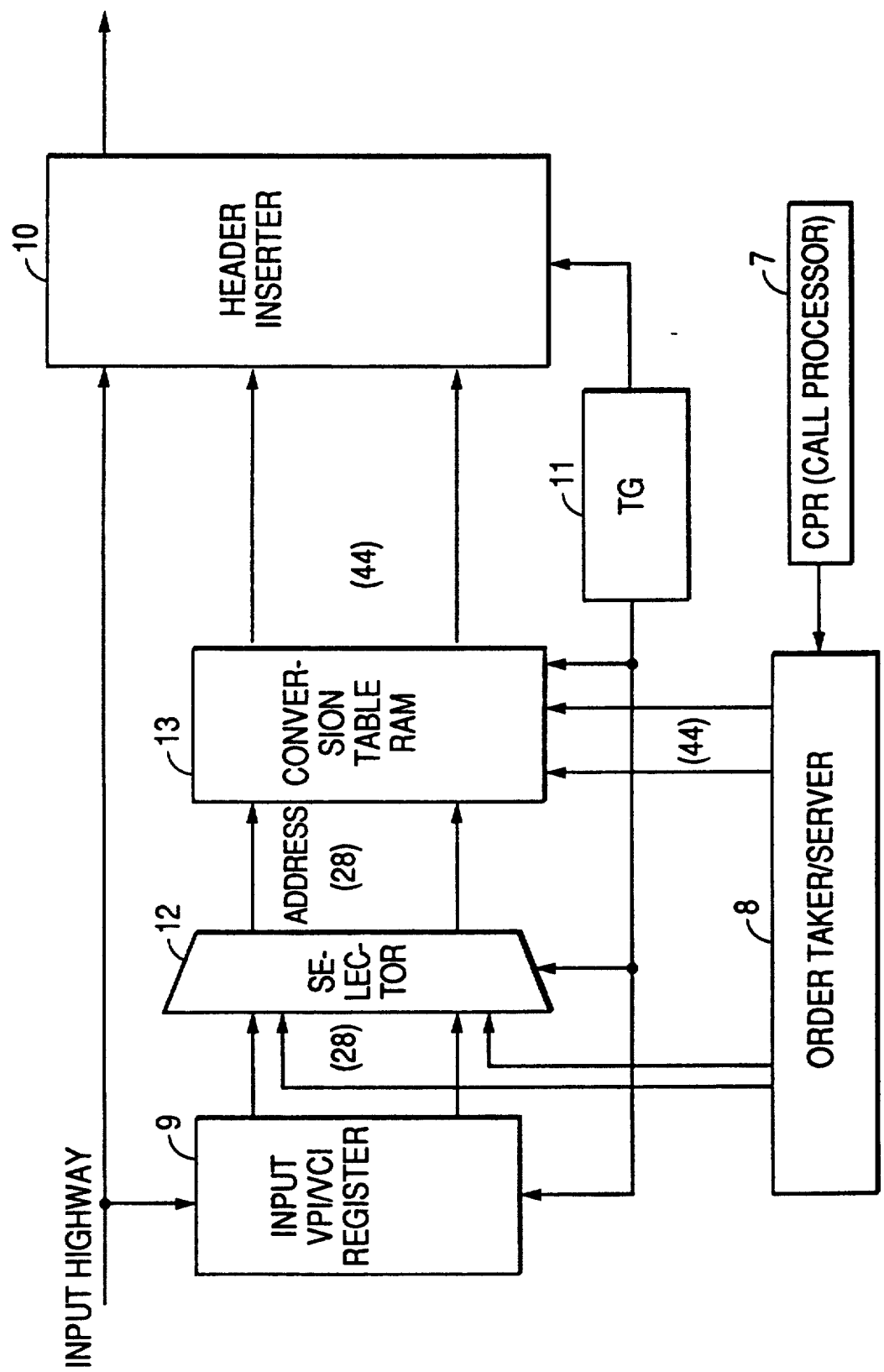
FIG. 3 is a block diagram of a conventional virtual channel converter (VCC)

Parts in FIG. 8 which are the same as those shown in FIGS. 3 and 7 have the same numbers.

A third register 37 receives data of the VPI and VCI of an incoming ATM cell transmitted from an input highway, at a timing controlled by a timing generator 36. The number of conversion circuit modules 38, each comprising the first and second registers 30 and 31, the comparator 32 and three state bus drivers 35, is the same as the number of combinations of the VPI and VCI. That is, there are two hundred fifty-six (256) conversion circuit modules 38, for example.

Figure 1:
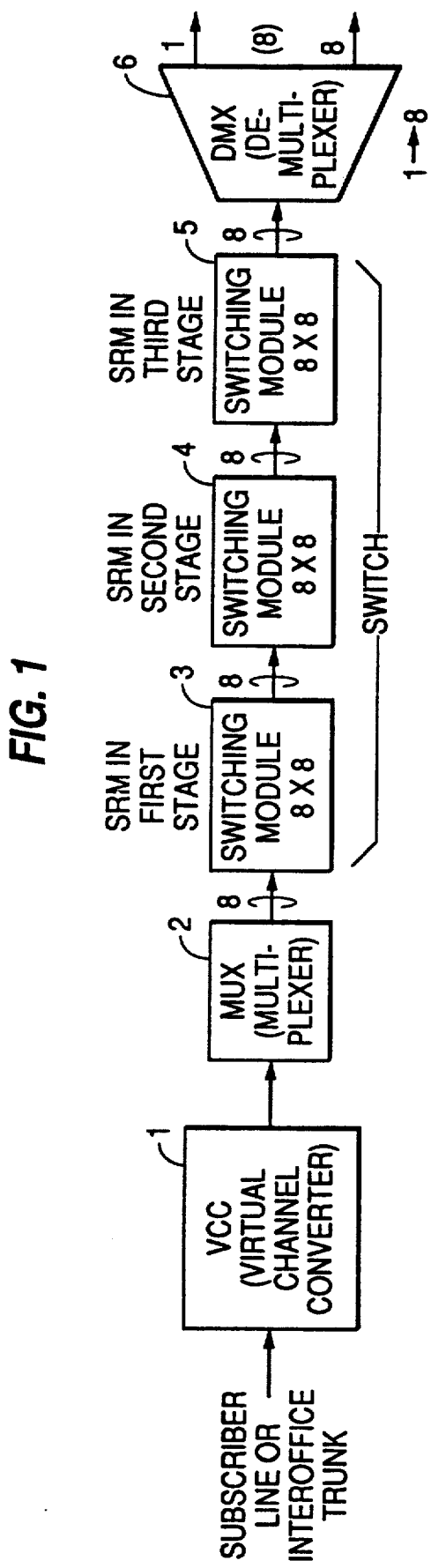
FIG. 1 is a block diagram of an ATM cell switching system.

The comparator 32 compares the contents of the third register 37 with that of the first register 30 in each of the conversion circuit modules 38. Only when the contents in the first and third registers 30 and 37 completely match, the comparator 32 outputs a signal to the three state bus drivers 35 for turning its gate on. The header inserter 10 attaches, to the header part of an incoming ATM cell on its way to the multiplexer 2 shown in FIG. 1, the contents of the second register 31, i.e. the VPI and VCI to be attached to the header part of an outgoing ATM cell on an output highway for the switcher and the tag for routing the incoming ATM cell in the switcher in a total of forty-four (44) bits.

Figure 9:
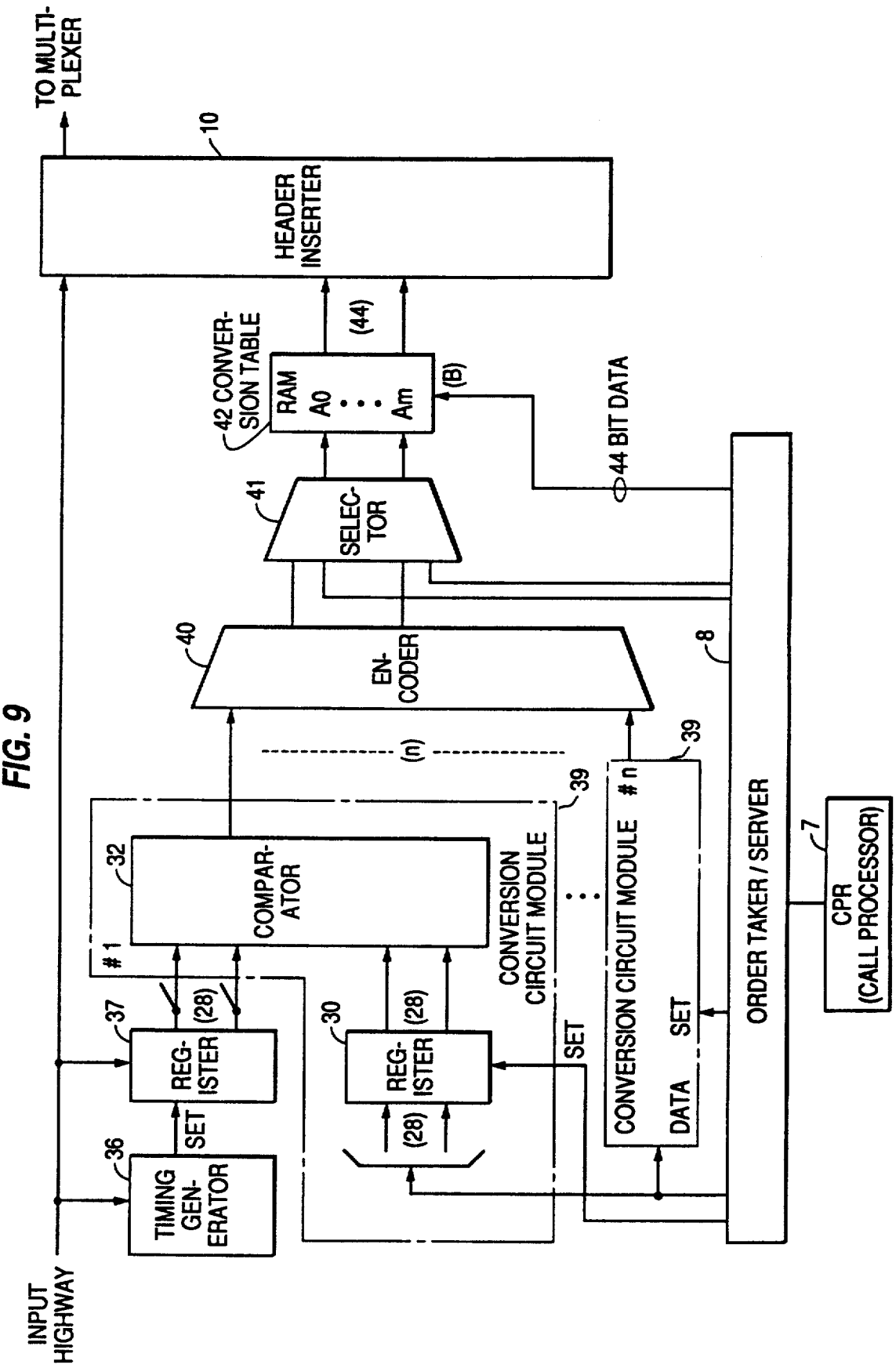
FIG. 9 is a block diagram of a second embodiment of a virtual channel converter (VCC)

FIG. 9 is a block diagram of a second embodiment of a virtual channel converter (VCC).

Parts in FIG. 9 which are the same as those shown in FIG. 8 have the same numbers. The differences between the configurations shown in FIGS. 8 and 9 are as follows:

Each of the conversion circuit modules 39 comprises only the first register 30 and the comparator 32. An encoder 40, a selector 41 and a random access memory (RAM) 42 are provided, in lieu of the second register 31 and the three state bus drivers 35. The random access memory (RAM) 42 stores a total of forty-four (44) bits comprising the VPI and VCI to be attached to an ATM cell on an output highway and a tag for routing an incoming ATM cell in a switcher.

The RAM 42 pre-stores contents comprising forty-four (44) bits to be outputted to the header inserter 10 at a write address inputted from the selector 41 under control of the order taker/server 8.

As described earlier, when the comparator 32 in one of the two hundred fifty-six (256) conversion circuit modules 39 outputs a match signal as a result of its comparison, the encoder 40 converts the decimal integer between 1 and 256, the number of an output line of the comparator 32, to a binary number to be supplied through the selector 41 to the RAM 42 as its read address. The header inserter 10 attaches the forty-four (44) bit data in the read address to an ATM cell on its way to the multiplexer 2.

Figure 10:
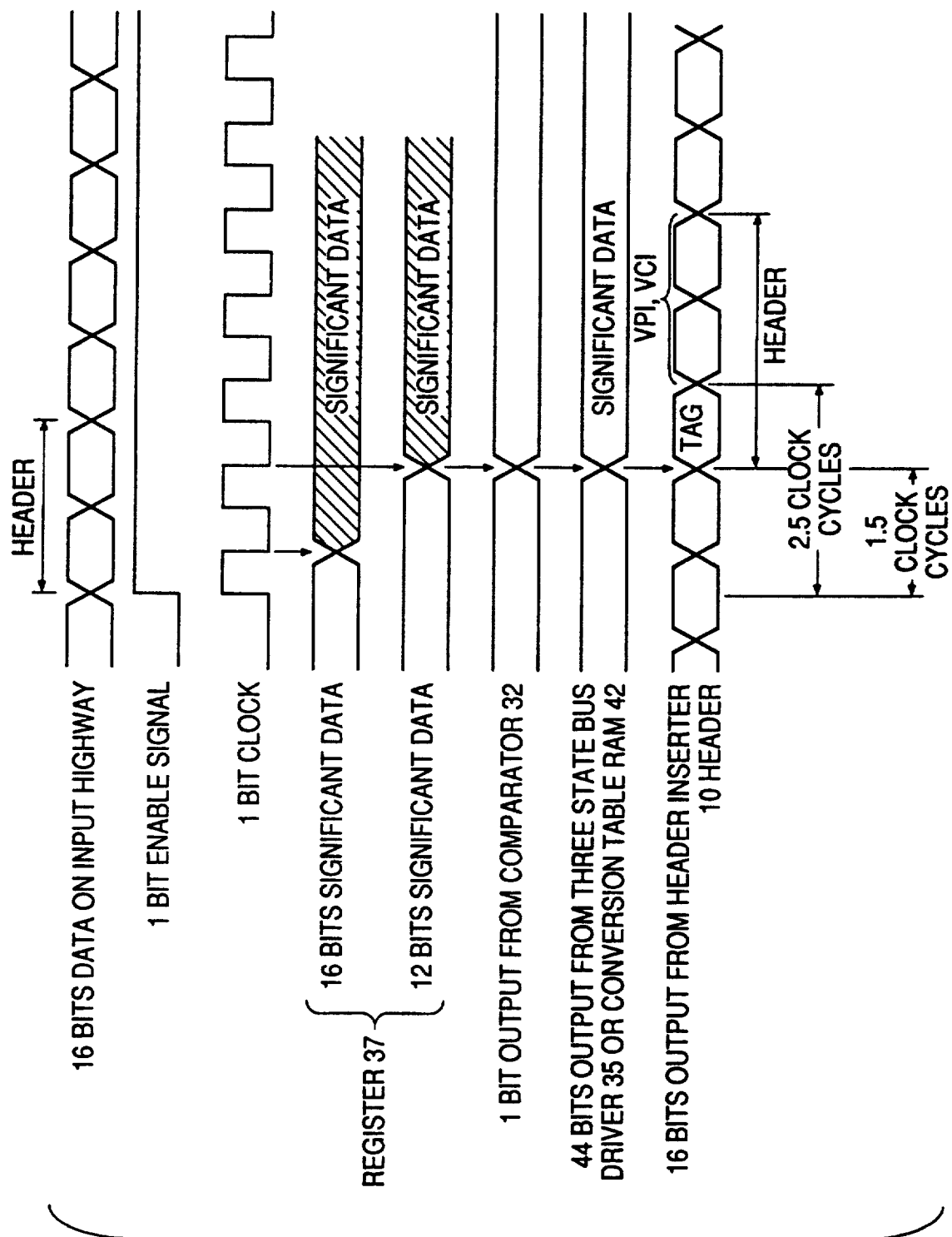
FIG. 10 is a timing chart for a virtual channel converter (VCC) in the first and second embodiments shown in FIGS. 8 and 9.

FIG. 10 is a timing chart for a virtual channel converter (VCC) in the first and second embodiments shown in FIGS. 8 and 9.

The third register 37 receives data of an incoming ATM cell on an input highway in sixteen (16) bit units, in synchronization with a clock cycle, starting at a rise of an enable signal from the timing generator 36 to an "H". The third register 37 also receives the clock signal frequency e.g. at nine mega hertz (9 MHz), from an input highway. Because the VPI and VCI in the header part of an ATM has a maximum of twenty-eight (28) bits, the third register 37 receives sixteen (16) bits in synchronization with a first clock cycle and twelve (12) bits in synchronization with a second clock cycle. After the third register 37 stores significant data comprising twenty-eight (28) bits, one of the comparators 32 outputs a match signal upon detecting a match. This causes the bus drivers 35 or the RAM 42 to output significant data comprising forty-four (44) bits to the header inserter 10.

The header inserter 10 outputs a tag comprising sixteen (16) bits after one and a half (1.5) clock cycles after a rise of the enable signal to an "H" and the VPI and VCI after a further elapse of one (1) clock cycle. The header inserter 10 attaches those forty-four (44) bits to the ATM cell on its way to the multiplexer 2. The operation of the header inserter 10 will be further explained later.

Figure 2:
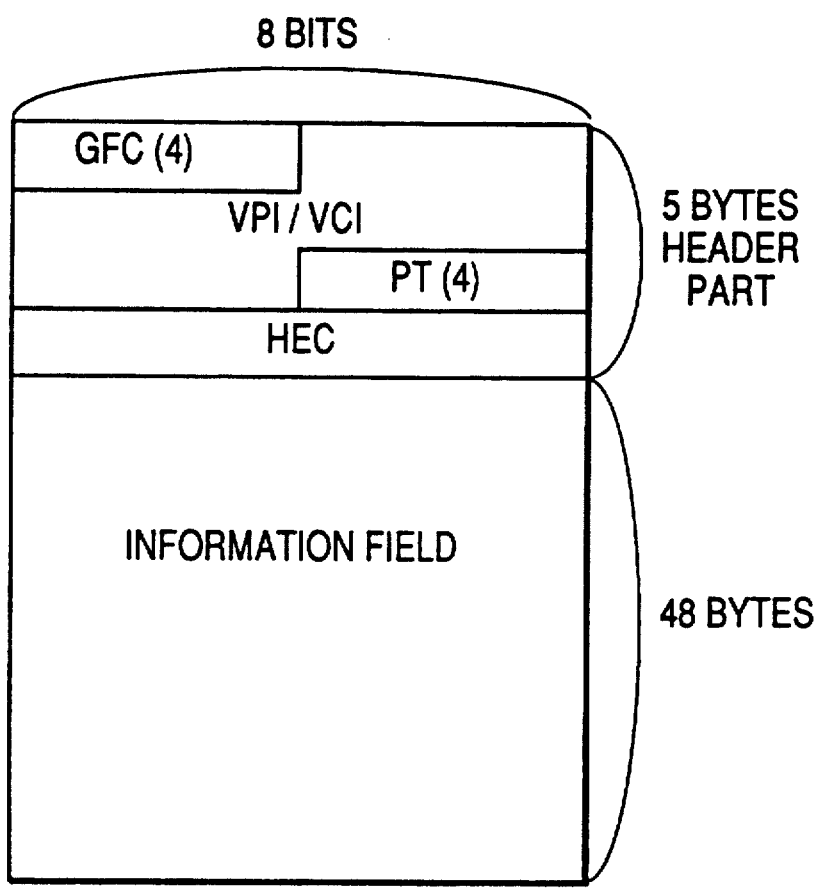
FIG. 2 shows an ATM cell format.
Figure 11:
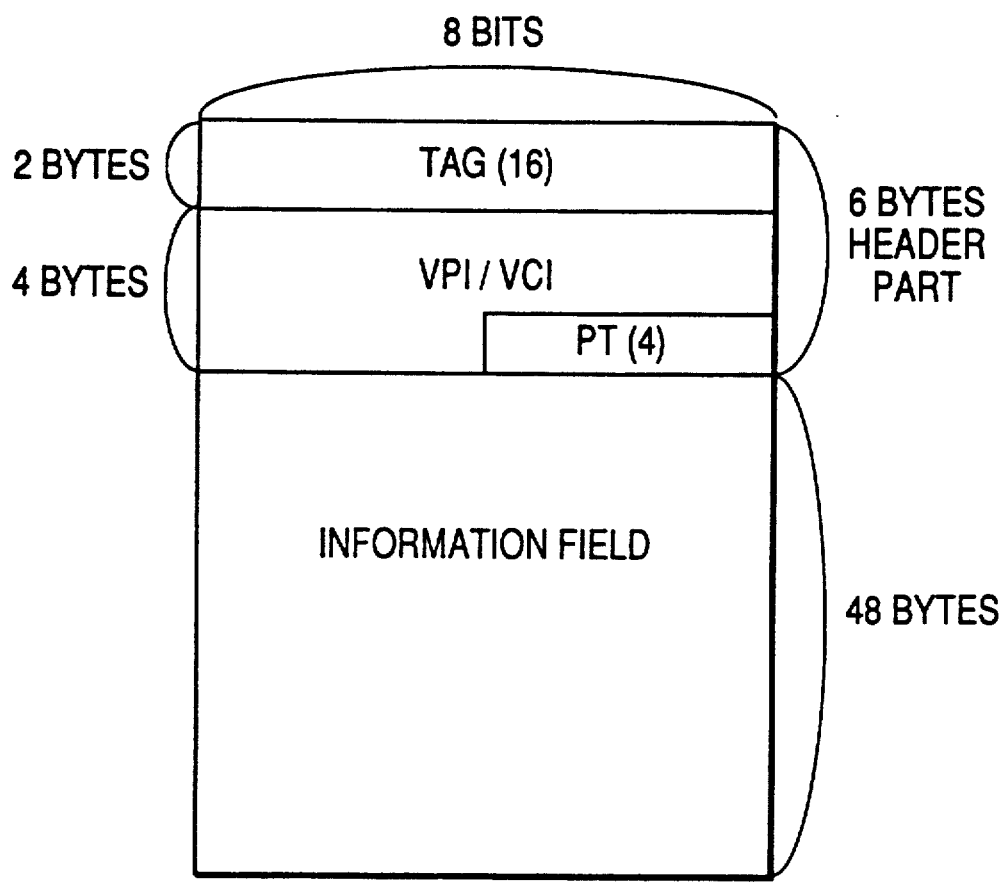
FIG. 11 shows an ATM cell format for use in an ATM cell switcher.

The format of an ATM cell shown in FIG. 11 is assumed to be slightly different from that of one shown in FIG. 2. That is, data on an input highway shown at the top in FIG. 11 comprise thirty-two (32) bits [or four (4) bytes] of a header part, whereas data outputted from the header inserter 10 shown at the bottom in FIG. 11 comprise forty-eight (48) bits [or six (6) bytes] of a header part. This is because the header part of an ATM cell in a virtual channel converter and a switcher has a format different from that shown in FIG. 2.

FIG. 11 shows an ATM cell format for use in an ATM cell switcher.

The head end of the header part of an ATM cell stores two (2) bytes of a tag for routing the ATM cell into the switcher. Then, following the head end, the header part of an ATM cell stores four (4) bytes of the VPI and VCI. One (1) byte for the header error control (HEC) included in the header part of an ATM cell format shown in FIG. 2 is unnecessary for routing the ATM cell in the switcher. Because the virtual channel converter changes VPI and VCI and takes off one (1) byte for HEC, before an ATM cell is inputted to a switcher, the output side of the switcher attaches one (1) byte for a new HEC and deletes the tag, thus making the header part again five (5) bytes before the ATM cell outgoes on an output highway.

Figure 12:
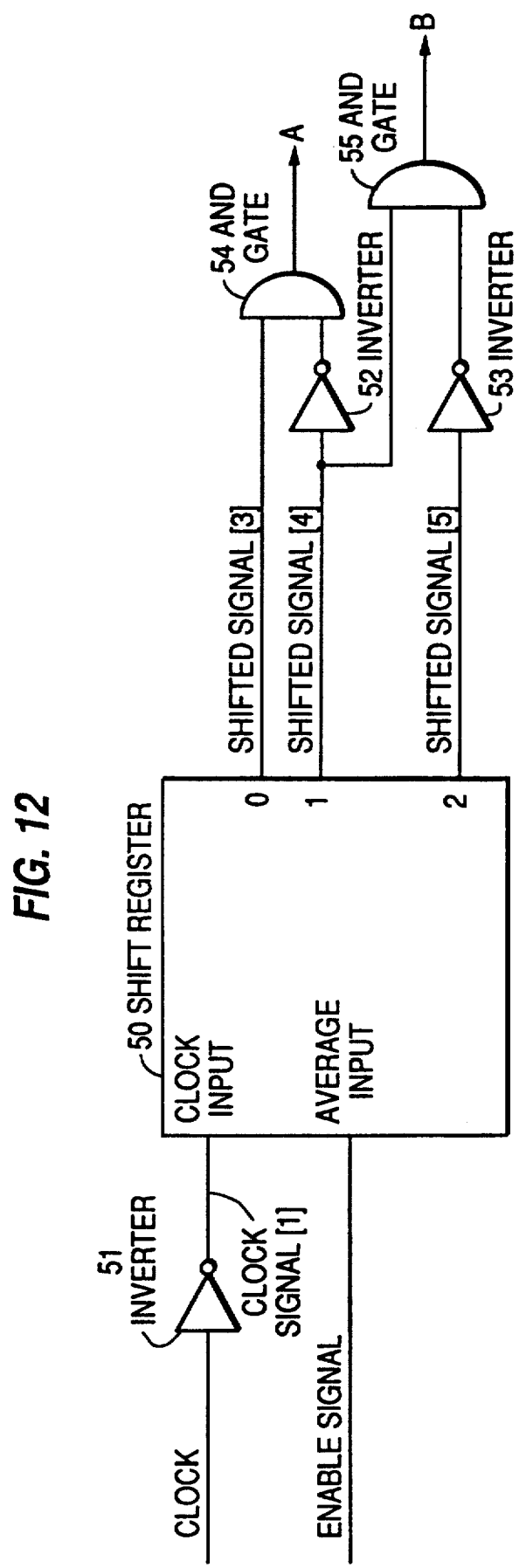
FIG. 12 is a block diagram of the timing generator 36 shown in FIGS. 8 and 9.

FIG. 12 is a block diagram of the timing generator 36 shown in FIGS. 8 and 9.

The timing generator 36 comprises a shift register 50, three (3) inverters 51, 52 and 53, and two (2) AND circuits 54 and 55. The shift register 50 receives the enable signal illustrated in FIG. 10 at its data input terminal. Inverter 51 inverts a clock signal inputted together with data from an input highway and supplies the inverted clock signal to a clock input terminal of the shift register 50. Two (2) inverters 52 and 53 are connected respectively to output terminals 1 and 2 of the shift register 50. AND circuit 54 receives an output of the shift register 50 from its output terminal 0 and an output from inverter 52. AND circuit 55 receives an output of the shift register 50 from its output terminal 1 and an output from inverter 53.

Figure 13:
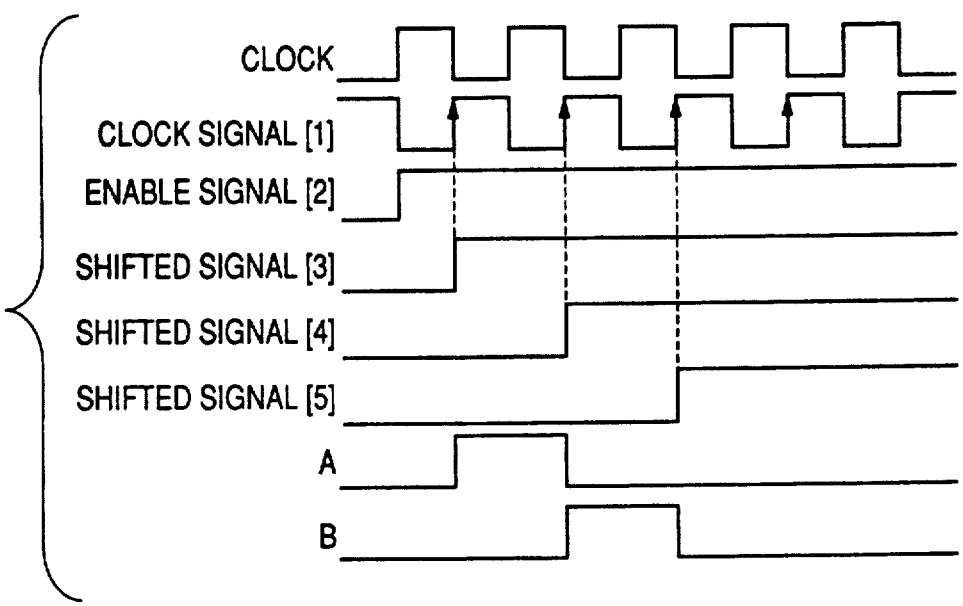
FIG. 13 is a timing chart for the timing generator 36.

FIG. 13 is a timing chart for the timing generator 36.

The operation of the timing generator 36 shown in FIG. 12 is explained below by referring to the timing chart shown in FIG. 13.

The shift register 50 receives an inverted signal [1] of a clock signal at its clock input terminal and an enable signal [2] of a clock signal at its data input terminal, and outputs three (3) results of sequentially shifting the enable signal [2] as shifted signals [3], [4] and [5] from its output terminals 0, 1 and 2 at rises of the inverted signal [1] received at its clock input terminal.

AND circuit 54 produces signal A, as the logical product of shifted signal [3] and the inversion of shifted signal [4] obtained by inverter 52. Signal A is used as a timing for storing, in the third register 37, the first sixteen (16) of the twenty-eight (28) bits of VPI and VCI.

AND circuit 55 produces signal B as the logical product of shifted signal [4] and the inversion of shifted signal [5] obtained by inverter 52. Signal B is used as a timing for storing, in the third register 37, the remaining twelve (12) bits in the twenty-eight (28) bits of VPI and VCI.

That is, the third register 37 comprises e.g. a first register element for storing sixteen (16) bits and a second register element for storing twelve (12) bits and uses signal A as a timing for storing sixteen (16) bit data in the first register element and signal B as a timing for storing twelve (12) bit data in the second register element.

Figure 14:
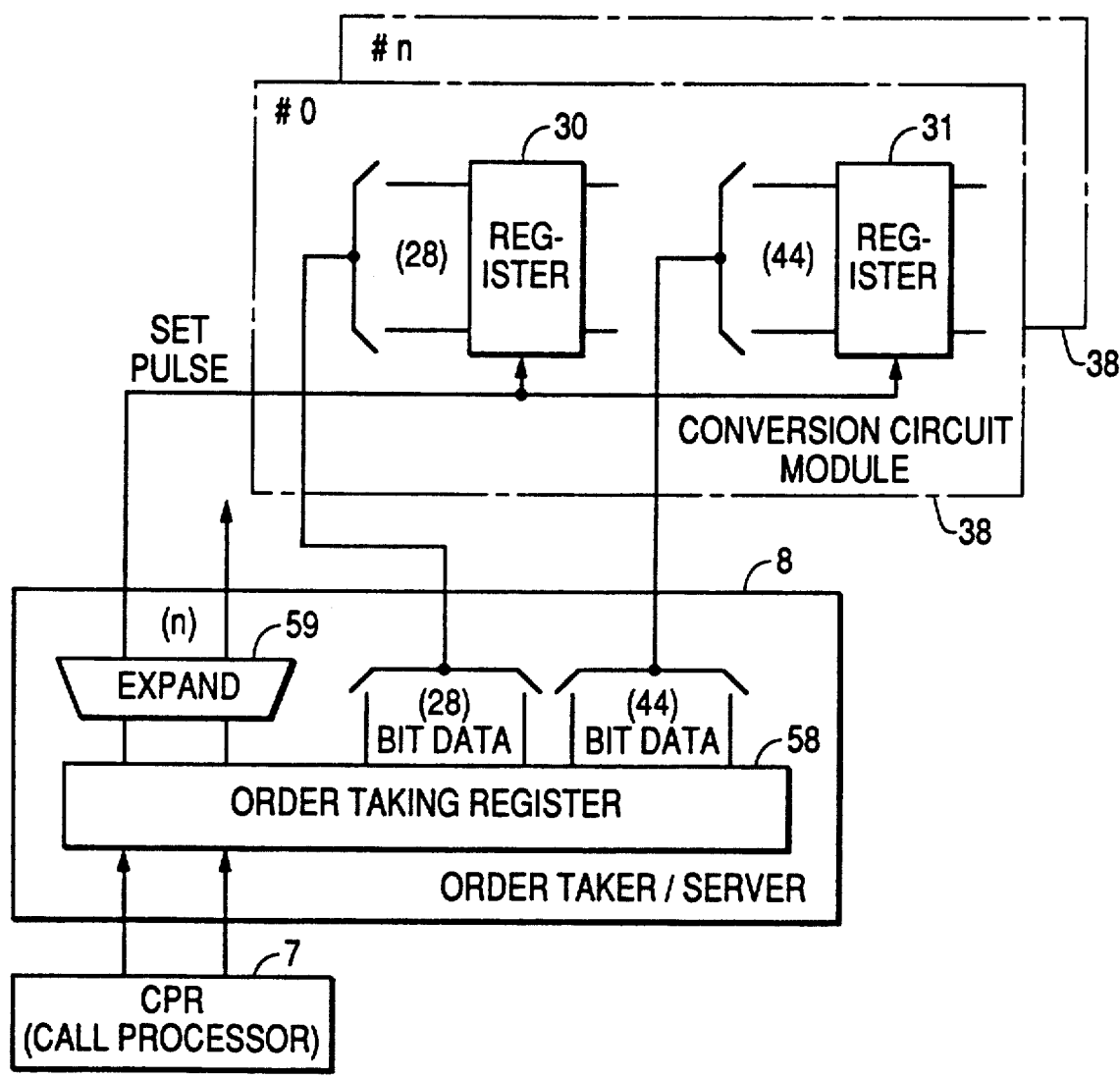
FIG. 14 is a block diagram of the order taker/server 8 shown in FIGS. 8 and 9.

FIG. 14 is a block diagram of the order taker/server 8 shown in FIGS. 8 and 9.

The order taker/server 8 comprises an order taking register 58 and an expander 59, for example. The order taking register 58 outputs twenty-eight (28) bits to the first register 30 for storing the VPI and VCI attached to the header part of an incoming ATM cell on an input highway and forty-four (44) bits to the second register 31 for storing the VPI and VCI to be attached to the header part of the outgoing ATM cell on an output highway and a tag for routing the ATM cell in the switcher. The expander 59 supplies set pulses to the first and second registers 30 and 31 through the order taking register 58 from the call processor (CPR) 7.

Figure 15:
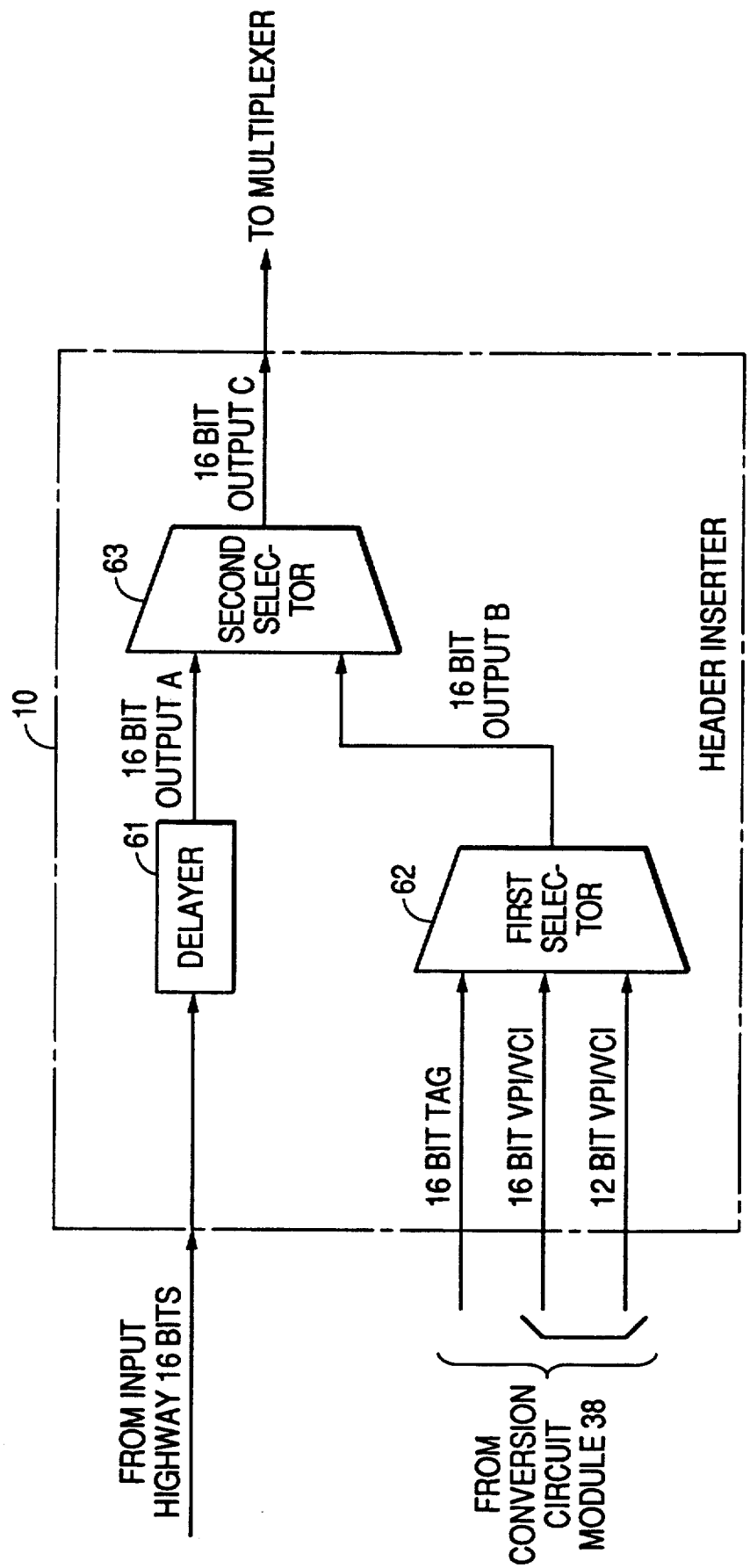
FIG. 15 is a block diagram of the header inserter 10 shown in FIGS. 8 and 9.

FIG. 15 is a block diagram of the header inserter 10 shown in FIGS. 8 and 9.

The header inserter 10 has a delayer 61 and a first selector 62 and a second selector 63. The delayer 61 delays the information field of an ATM cell by two and a half (2.5) clock cycles, as shown in FIG. 10. The first selector 62 sequentially outputs the tag, VPI and VCI outputted from the conversion circuit modules 38 shown in FIG. 8. The second selector 63 sequentially outputs the output from the first selector 62 and the delayer 61.

Figure 16:
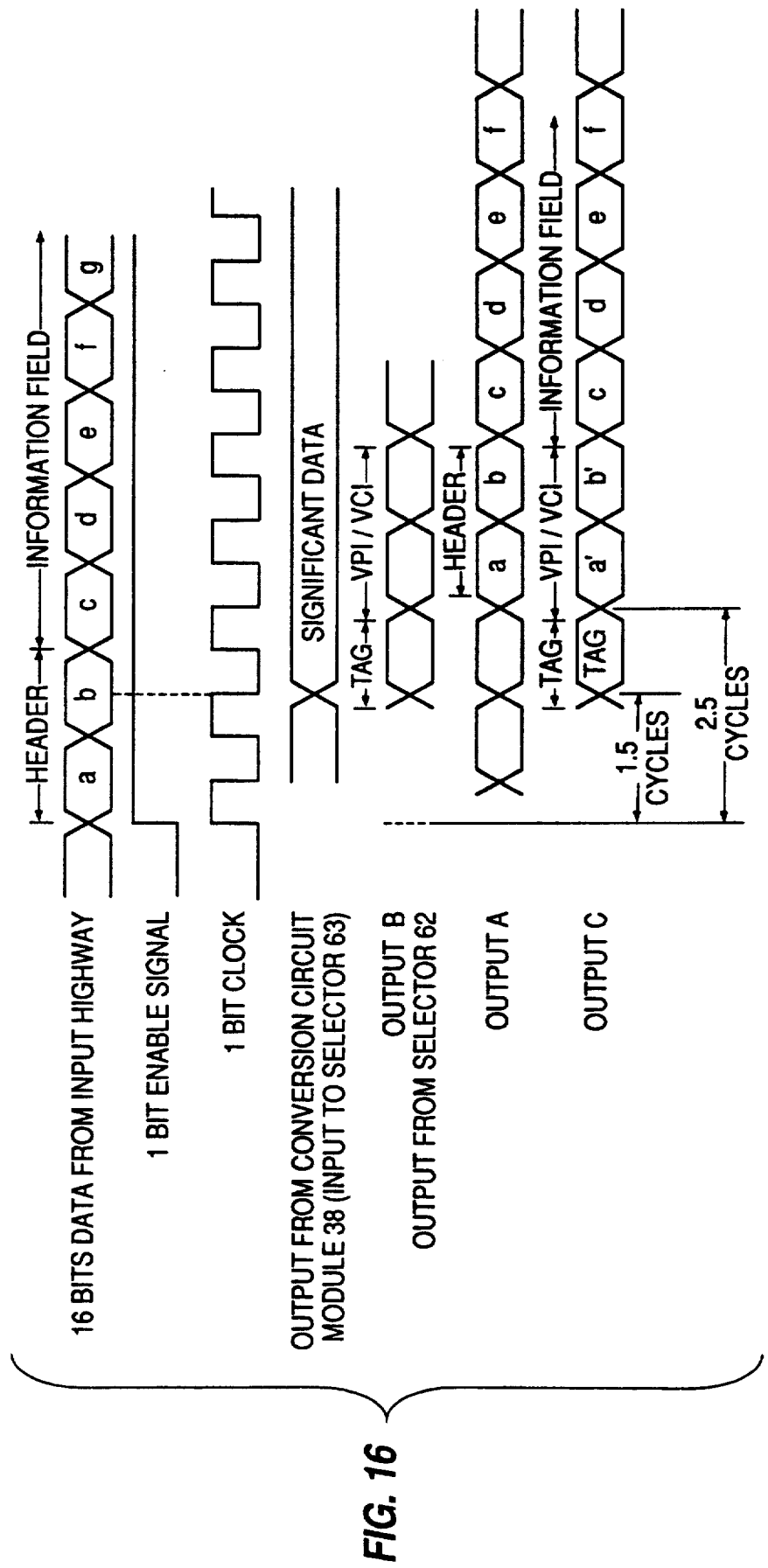
FIG. 16 is a timing chart for the header inserter 10.

FIG. 16 is a timing chart for the header inserter 10.

Four (4) bytes in the header part of an incoming ATM cell on an input highway, excluding one (1) byte for HEC (header error control), are named a and b, and forty-eight (48) in the information field of an incoming ATM cell on an input highway are named c, d and so on. As shown in FIG. 10, the conversion circuit modules 38 output significant data delayed by one and a half (1.5) clock cycles. The first selector 62 receives the delayed significant data, and the second selector 63 sequentially outputs the tag, VPI and VCI as output B. The second selector 63 sequentially outputs, as output C, output B from the first selector 62 and output A from the delayer 61, to the multiplexer 2 shown in FIG. 1. At this time, the data a and b in the header part are converted to data a' and b'.

As explained in detail above, this invention enables the VPI and VCI in a maximum total of twenty-eight (28) bits to be fully supported, thereby structuring an almighty virtual channel converter.

This invention is applicable to a communications system using ATM cells such as a B-ISDN. An increase in the number of conversion circuit modules allows a greater number of identifier combinations. Putting the conversion circuit modules in LSIs contributes to the improved effectiveness of an ISDN switcher.

What is claimed is:

1. A virtual identifier conversion system, put in a stage preceding a switcher for use in a broadband integrated services digital network, for converting an input virtual path identifier and an input virtual channel identifier attached to an ATM cell on an input highway of said switcher to an output virtual path identifier and an output virtual channel identifier pair to be attached to said ATM cell on an output highway and for attaching a tag for routing said ATM cell in said switcher, said virtual identifier conversion system comprising:
a plurality of identifier comparator units, each corresponding to one of possible virtual path and channel identifier pairs and each unit comprising:
input identifier storing means for storing a stored virtual path identifier and a stored virtual channel identifier;
comparing means for comparing for a match of said input virtual path identifier and said input virtual channel identifier attached to said ATM cell inputted from said input highway with the stored virtual path identifier and the stored virtual channel identifier stored in said input identifier storing means;
output identifier storing means for storing the output virtual path identifier and the output virtual channel identifier to be attached to said ATM cell on the output highway, as well as the tag for routing said ATM cell in said switcher, each of said output identifier storing means comprising a first register for holding said output virtual path identifier, said output virtual channel identifier, and said tag for routing said ATM cell in the switcher;
output controlling means for outputting the contents of said output identifier storing means when said comparing means detects a match, each of said output controlling means comprising three state bus drivers for receiving the data of respective bits held in said first register, the number of said three state bus drivers being equal to the total number of bits in said virtual path identifier, said virtual channel identifier and said tag inputted to a control input terminal receiving a match signal from one of said comparing means; and
header inserting means for inserting the contents of one of said output identifier storing means into the header part of said ATM cell on its way to said switcher, said one of said output identifier storing means included in the one of said identifier comparator units having the one of said comparing means detecting a match, said header inserting means comprising:
a delayer for delaying said ATM cell inputted from said input highway by two and a half cycles of a clock signal;
a first selector for sequentially outputting the data held in said first register in the order of the tag, the output virtual path identifier and the output virtual channel identifier; and
a second selector for sequentially outputting an output from said first selector and an output from said delayer by switching; and controlling means for storing all combinations of a virtual path identifier and a virtual channel identifier attachable to an ATM cell inputted to said switcher and storing appropriate ones of the combinations as said stored virtual path identifier and stored virtual channel identifier in said input identifier storing means respectively in said plurality of identifier comparator units.

2. A virtual identifier conversion system, put in a stage preceding a switcher for use in a broadband integrated services digital network, for converting an input virtual path identifier and an input virtual channel identifier attached to an ATM cell on an input highway of said switcher to an output virtual path identifier and an output virtual channel identifier pair to be attached to said ATM cell on an output highway and for attaching a tag for routing said ATM cell in said switcher, said virtual identifier conversion system comprising:

a plurality of identifier comparator units, each corresponding to one of possible virtual path and channel identifier paris and each unit comprising:

input identifier storing means for storing a stored virtual path identifier and a stored virtual channel identifier, said input identifier storing means comprising a first register for holding said stored virtual path identifier and said stored virtual channel identifier;

comparing means for comparing for a match of said input virtual path identifier and said input virtual channel identifier attached to said ATM cell inputted form said input highway with the stored virtual path identifier and stored virtual channel identifier stored in said input identifier storing means, said comparing means comprising:

exclusive OR gates, each receiving the content of the corresponding bit stored in said first register in negative logic at first input terminals and each bit of said input virtual path identifier and said input virtual channel identifier attached to said ATM cell inputted form said input highway at second input terminals, said exclusive OR gates provided in a number equal to the total number of bits composing said input virtual path identifier and said input virtual channel identifier; and a NAND gate for receiving all outputs from said exclusive OR gates;

output identifier storing means for storing the output virtual path identifier an the output virtual channel identifier to be attached to said ATM cell on an output highway, as well as the tag for routing said ATM cell in said switcher, each of said output identifier storing means comprising a second register for holding said output virtual path identifier, said output virtual channel identifier, and said tag for routing said ATM cell in the switcher;

output controlling means for outputting the contents of said output identifier storing means when said comparing means detects a match, each of said output controlling means comprising three state bus drivers for receiving the data of respective bits held in said second register, the number of said three state bus drivers being equal to the total number of bits in said output virtual path identifier, said output virtual channel identifier and said tag inputted to a control input terminal receiving a match signal form one of said comparing means; and header inserting means for inserting the contents of one of said output identifier storing means into the header part of said ATM cell on its way to said switcher, said one of said output identifier storing means included in the one of said identifier comparator units having the one of said comparing means detecting a match, said header inserting means comprising:

a delayer for delaying said ATM cell inputted from said input highway by two and a half cycles of a clock signal;

a first selector for sequentially outputting the data held in said second register in the order of the tag, said output virtual path identifier and said output virtual channel identifier; and a second selector for sequentially outputting an output from said first selector and an output from said delayer by switching; and controlling means for storing all combinations of a virtual path identifier and a virtual channel identifier attachable to an ATM cell inputted to said switcher and storing appropriate ones of the combinations as said stored virtual path identifiers and said stored virtual channel identifiers in said input identifier storing means respectively in said plurality of identifier comparator units, said controlling means comprising:

a call processor for controlling the switching of said ATM cell; and an order taker/server for having said first register hold the values of the stored virtual path identifier and the stored virtual channel identifier under the control of said call processor.

3. The virtual identifier conversion system according to claim 1, wherein said virtual channel converter further comprises:

exclusive OR gates receiving said stored virtual path identifier and said stored virtual channel identifier at first input terminals;

a second register for holding said input virtual path identifier and said input virtual channel identifier attached to said ATM cell inputted from said input highway, and for outputting respective bits of said input virtual path identifier and said input virtual channel identifier to second input terminals of said exclusive OR gates; and a timing generator for generating a timing for having said second register hold said input virtual path identifier and said input virtual channel identifier.

4. The virtual identifier conversion system according to claim 2, wherein said virtual channel converter further comprises:

a second register for holding said input virtual path identifier and said input virtual channel identifier attached to said ATM cell inputted from said input highway, and for outputting respective bits of said input virtual path identifier and said input virtual channel identifier to said second input terminals of said exclusive OR gates in said comparing means; and a timing generator for generating a timing for having said second register hold said input virtual path identifier and said input virtual channel identifier.

5. A virtual identifier conversion system, put in a stage preceding a switcher for use in a broadband integrated services digital network, for converting an input virtual path identifier and input virtual channel identifier pair attached to an ATM cell on an input highway of said switcher to an output virtual path identifier and an output virtual channel identifier to be attached to said ATM cell on an output highway and for attaching a tag for routing said ATM cell in said switcher, said virtual identifier conversion system comprising:

- a plurality of identifier comparator units, each corresponding to one of possible virtual path and channel identifier pairs and each unit comprising:
  - input identifier storing means for storing a stored virtual path identifier and a stored virtual channel identifier;
  - comparing means for comparing for a match of said input virtual path identifier and said input virtual channel identifier attached to said ATM cell inputted from said input highway from said ATM cell with said stored virtual path identifier and said stored virtual channel identifier stored in said input identifier storing means; and
  - loadable output means for loadably storing a converted virtual path and channel identifier corresponding to the stored virtual path and channel identifier and outputting the converted virtual path and channel identifier upon a match as the output virtual path identifier and output virtual channel identifier, respectively; and
- controlling means for storing all the combinations of a virtual path identifier and a virtual channel identifier attachable to said ATM cell input to said switcher and storing appropriate ones of the combinations as said stored virtual path identifiers and said stored virtual channel identifiers in said input identifier storing means respectively in said plurality of identifier comparator units, and
- said input virtual path identifier and said input virtual channel identifier in the header part of said ATM cell comprising twenty-four bits in total, when said switcher switches said ATM cell between a user and a network, and
- said input said virtual path identifier and said input virtual channel identifier in the header part of said ATM cell comprising twenty-eight bits in total, when said switcher switches said ATM cell between networks.

* * * * *

UNITED STATES PATENT AND TRADEMARK OFFICE
CERTIFICATE OF CORRECTION

PATENT NO. : 5,271,010
DATED : December 14, 1993
INVENTOR(S) : Miyake et al.

It is certified that error appears in the above-identified patent and that said Letters Patent is hereby corrected as shown below:

Col. 1, line 29, after "system" insert --.--.

Col. 9, line 53, change "(45)" to --(48).

Col. 11, line 31, change "form" to --from--.

Col. 12, line 1, change "form" to --from--.

Signed and Sealed this

Ninth Day of August, 1994

Attest:

BRUCE LEHMAN

Attesting Officer

Commissioner of Patents and Trademarks